(12) United States Patent
Pain et al.

(10) Patent No.: US 12,264,405 B2
(45) Date of Patent: Apr. 1, 2025

(54) METHODS FOR ELECTROCHEMICAL ADDITIVE MANUFACTURING WHILE MODIFYING ELECTROLYTE SOLUTIONS

(71) Applicant: Fabric8Labs, Inc., San Diego, CA (US)

(72) Inventors: David Pain, San Diego, CA (US); Jeffrey Herman, San Diego, CA (US); Kareemullah Shaik, San Diego, CA (US); Andrew Edmonds, San Diego, CA (US)

(73) Assignee: Fabric8Labs, Inc., San Diego, CA (US)

( * ) Notice: Subject to any disclaimer, the term of this patent is extended or adjusted under 35 U.S.C. 154(b) by 271 days.

(21) Appl. No.: 17/823,227

(22) Filed: Aug. 30, 2022

(65) Prior Publication Data

US 2023/0089135 A1 Mar. 23, 2023

Related U.S. Application Data

(60) Provisional application No. 63/246,152, filed on Sep. 20, 2021.

(51) Int. Cl.
*C25D 1/00* (2006.01)
*B33Y 10/00* (2015.01)
*B33Y 30/00* (2015.01)

(52) U.S. Cl.
CPC .............. *C25D 1/003* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| 4,575,330 A | 3/1986 | Hull |
| 4,678,282 A | 7/1987 | Yaniv et al. |

(Continued)

FOREIGN PATENT DOCUMENTS

| CN | 104178782 A | 12/2014 |
| CN | 204097583 U | 1/2015 |

(Continued)

OTHER PUBLICATIONS

Whitaker et al. "Electrochemical printing: software reconfigurable electrochemical microfabrication", J. Micromech. Microeng., 15, 1498-1503, 2005 (Year: 2005).*

(Continued)

*Primary Examiner* — Stefanie S Wittenberg
(74) *Attorney, Agent, or Firm* — Polygon IP, LLP (57) ABSTRACT

Described herein are electrochemical additive manufacturing systems and methods of using such systems. In some examples, a method comprises flowing an electrolyte solution into the gap formed by an electrode array and a deposition electrode and depositing (electroplating) a target material onto the deposition electrode. The method also comprises changing one or more characteristics of the electrolyte solution within the system, e.g., to remove deposition byproducts, replenish consumed components, and/or change the solution composition to modify various properties of the deposited target material (e.g., composition, morphology) without major changeovers within the system. These electrolyte changes can be performed dynamically while the system continues to operate. The changed characteristics can be acid concentration, feedstock ion concentration, additive concentration, temperature, and flow rate. In some examples, the solution is flowed into the gap from a supply reservoir and recirculated back into the supply reservoir after exiting the gap.

20 Claims, 9 Drawing Sheets

(56) References Cited

U.S. PATENT DOCUMENTS

| | | | |
|---|---|---|---|
| 5,132,820 | A | 7/1992 | Someya et al. |
| 5,403,460 | A | 4/1995 | Sala et al. |
| 5,641,391 | A | 6/1997 | Hunter et al. |
| 5,998,805 | A | 12/1999 | Shi et al. |
| 6,036,834 | A | 3/2000 | Clerc |
| 7,839,831 | B2 | 11/2010 | Vrcelj et al. |
| 8,168,540 | B1 | 5/2012 | Reid et al. |
| 8,681,077 | B2 | 3/2014 | Kimura |
| 9,777,385 | B2 | 10/2017 | Wirth et al. |
| 10,465,307 | B2 | 11/2019 | Pain et al. |
| 10,724,146 | B1 | 7/2020 | Pain et al. |
| 10,914,000 | B1 | 2/2021 | Pain et al. |
| 10,947,632 | B1 | 3/2021 | Pain et al. |
| 11,232,956 | B2 | 1/2022 | Pain et al. |
| 11,313,035 | B2 | 4/2022 | Pain et al. |
| 11,313,036 | B2 | 4/2022 | Pain et al. |
| 11,401,603 | B2 | 8/2022 | Pain et al. |
| 2001/0014409 | A1 | 8/2001 | Cohen |
| 2003/0006133 | A1 | 1/2003 | Metzger |
| 2004/0129573 | A1 | 7/2004 | Cohen |
| 2005/0045252 | A1 | 3/2005 | Yamasaki et al. |
| 2005/0176238 | A1 | 8/2005 | Cohen et al. |
| 2005/0183959 | A1 | 8/2005 | Wilson et al. |
| 2005/0202660 | A1 | 9/2005 | Cohen et al. |
| 2005/0223543 | A1 | 10/2005 | Cohen et al. |
| 2006/0283539 | A1 | 12/2006 | Slafer |
| 2007/0068819 | A1 | 3/2007 | Singh et al. |
| 2007/0089993 | A1 | 4/2007 | Schwartz et al. |
| 2007/0221504 | A1* | 9/2007 | Luo .................. C25D 21/14 205/118 |
| 2010/0300886 | A1 | 12/2010 | Lin et al. |
| 2011/0210005 | A1 | 9/2011 | Bossche et al. |
| 2017/0145584 | A1 | 5/2017 | Wirth et al. |
| 2018/0280973 | A1* | 10/2018 | Haeberle ........... B01L 3/502738 |
| 2019/0160594 | A1 | 5/2019 | Flamm et al. |
| 2021/0047744 | A1 | 2/2021 | Biton |
| 2022/0235481 | A1* | 7/2022 | Mendonsa ........... C25D 17/007 |

FOREIGN PATENT DOCUMENTS

| | | |
|---|---|---|
| CN | 104593830 A | 5/2015 |
| WO | 2017087884 A1 | 5/2017 |
| WO | 2019150362 A1 | 8/2019 |
| WO | 2021041265 A1 | 3/2021 |

OTHER PUBLICATIONS

English translation CN 110306210 (Year: 2019).*

Huang et al. "Electrochemical Formation of Free-standing 3D Structures Using Injection of Additives", JES, 164, 12, D737-D743, 2017 (Year: 2017).*

Kim et al. "The characteristics of Selective 3D Metal Additive Process Using Electrochemical Deposition and Nozzle Fluid Dynamics", Fontiers in Mechanical Engineering, Mar. 2020, vol. 6 (Year: 2020).*

Frey et al., "Switch-matrix-based High-Density Microelectrode Array in CMOS Technology", IEEE Journal of Solid-State-Circuits, Feb. 2010, pp. 467-482, vol. 45, No. 2.

International Search Report and Written Opinion for PCT/US2020/047531 dated Sep. 29, 2020.

Nakamura et al., Incorporation of input function into displays using LTPS TFT technology, Journal of the SID, 2006, pp. 363-369, 14/4.

Stewart et al., "Polysilicon TFT Technology for Active Matrix OLEO Displays", IEEE Transactions on Electron Devices, May 2001, pp. 845-851, vol. 48, No. 5.

Supplementary International Search Report for PCT/US2020/047531 dated Nov. 22, 2021.

U.S. Appl. No. 17/535,437, filed Nov. 24, 2021.

U.S. Appl. No. 17/566,546, filed Dec. 30, 2021.

* cited by examiner

METHODS FOR ELECTROCHEMICAL ADDITIVE MANUFACTURING WHILE MODIFYING ELECTROLYTE SOLUTIONS

CROSS-REFERENCE TO RELATED APPLICATIONS

This application claims the benefit under 35 U.S.C. § 119(e) of US Provisional Patent Application No. 63/246,152, filed on Sep. 20, 2021, which is incorporated herein by reference in its entirety for all purposes.

BACKGROUND

Additive manufacturing, also known as 3-dimensional (3D) printing, is often used for the production of complex parts using a layer-by-layer deposition process on substrates. Additive manufacturing can utilize a variety of processes in which various materials (e.g., plastics, liquids, and/or powders) are deposited, joined, and/or solidified. Some examples of techniques used for additive manufacturing include vat photopolymerization, material jetting, binder jetting, powder bed fusion (e.g., using selective laser melting or electron beam melting), material extrusion, directed energy deposition, and sheet lamination. Metal additive manufacturing has been limited due to the high cost associated with selective laser melting and electron beam melting systems. Further, thermally fusing produces parts with rough surface finishes because the unmelted metal powder is often sintered to the outer edges of the finished product.

SUMMARY

Described herein are electrochemical additive manufacturing systems and methods of using such systems. In some examples, a method comprises flowing an electrolyte solution into the gap formed by an electrode array and a deposition electrode and depositing (electroplating) a target material onto the deposition electrode. The method also comprises changing one or more characteristics of the electrolyte solution within the system, e.g., to remove deposition byproducts, replenish consumed components, and/or change the solution composition to modify various properties of the deposited target material (e.g., composition, morphology) without major changeovers within the system. These electrolyte changes can be performed dynamically while the system continues to operate. The changed characteristics can be acid concentration, feedstock ion concentration, additive concentration, temperature, and flow rate. In some examples, the solution is flowed into the gap from a supply reservoir and recirculated back into the supply reservoir after exiting the gap.

In some examples, a method of electrochemical additive manufacturing using an electrochemical additive manufacturing system comprising an electrodeposition cell formed by an electrode array and a deposition electrode is provided. The method comprises flowing an electrolyte solution into a gap formed by the electrode array, comprising individually-addressable electrode portions, and the deposition electrode. The method further comprises depositing a target material onto the deposition electrode from the electrolyte solution by flowing a current between the electrode array, operating as an anode, and the deposition electrode, operating as a cathode. The method also comprises changing one or more characteristics of the electrolyte solution within the electrochemical additive manufacturing system using one or more electrolyte-altering devices, wherein the one or more characteristics of the electrolyte solution, which are changed, comprise one or more of an acid concentration, a feedstock ion concentration, a plating additive concentration, a temperature, and a flow rate. The method comprises measuring one or more characteristics of the electrolyte solution thereby producing one or more measured values, wherein the one or more characteristics of the electrolyte solution are changed based on the one or more measured values. In some examples, flowing the current between the electrode array and the deposition electrode is caused by selectively applying an individual voltage between the deposition electrode and each of the individually-addressable electrode portions.

In some examples, the electrolyte solution is flowed into the gap from a supply reservoir. The electrolyte solution is recirculated back into the supply reservoir after exiting the gap. For example, the method further comprises flowing a second electrolyte solution from a second supply reservoir into the gap, wherein the target material is deposited out of the second electrolyte solution onto the deposition electrode. In some examples, the method further comprises changing one or more characteristics of the second electrolyte solution, wherein the one or more characteristics of the second electrolyte solution, which are changed, comprise one or more of the acid concentration, the feedstock ion concentration, the plating additive concentration, the temperature, and the flow rate.

In some examples, one or more characteristics of the electrolyte solution are changed before flowing the electrolyte solution into the gap or while the electrolyte solution is in the gap. In the same or other examples, the one or more characteristics of the electrolyte solution, which are changed, comprise two or more of the acid concentration, the feedstock ion concentration, the plating additive concentration, the temperature, and the flow rate.

In some examples, the electrodeposition cell has a volume filled with the electrolyte solution. The electrolyte solution is flowed at a volumetric flow rate through the electrodeposition cell. The ratio of the volume to the volumetric flow rate is less than 1 second.

In some examples, the electrochemical additive manufacturing system further comprises a collection reservoir. The electrolyte solution flows from the gap into the collection reservoir.

In some examples, one more electrolyte-altering devices comprise one or more of a material injector, a thermal unit, and a filter. For example, the one more electrolyte-altering devices comprise the material injector such that the material injector changes the characteristic of the electrolyte solution by injecting one or more of a solvent, an acid, a feedstock ion source, and a plating additive into the electrolyte solution. In some examples, the solvent is selected from the group consisting of water, molten salts, organic solvents, and ionic liquids. In the same or other examples, the acid is selected from the group consisting of sulfuric acid, acetic acid, hydrochloric acid, nitric acid, hydrofluoric acid, boric acid, citric acid, and phosphoric acid. The feedstock ion source can be selected from the group consisting of copper sulfate, copper chloride, copper fluoroborate, copper pyrophosphate, copper cyanide, nickel sulfate, nickel ammonium sulfate, nickel chloride, nickel fluoroborate, zinc sulfate, sodium thiocyanate, zinc chloride, and ammonium chloride. The plating additive is selected from the group consisting of an accelerator, a suppressor, a brightener, a grain refiner, a leveler, and co-deposition particulates.

In some examples, the electrolyte-altering device is the filter. The filter changes one or more characteristics of the electrolyte solution by removing at least a part of the plating additive from the electrolyte solution. In more specific examples, flowing the electrolyte solution through the filter is selectively controlled using a valve.

In some examples, the characteristic of the electrolyte solution is measured using one or more of a thermocouple, a pH meter, an ultraviolet and visible light range (UV-Vis) spectrometer, an inline process mass spectrometer, a high-performance liquid chromatography (HPLC) device, a cyclic voltammetric stripping (CVS) device, or a potentiostat.

In some examples, the characteristic is measured before the electrolyte solution enters the gap. Alternatively, the characteristic is measured after the electrolyte solution has exited the gap.

In some examples, the gap has a first height value when flowing an electrolyte solution into the gap. The gap has a second height value during depositing the target material. The first height value is greater than the second height value.

In some examples, an electrochemical additive manufacturing system comprises a supply reservoir operable to store an electrolyte solution having a composition and an electrodeposition cell, fluidically coupled to the supply reservoir and comprising a deposition electrode and an electrode array, forming a gap with the deposition electrode and comprising individually-addressable electrode portions. During the controlled electrodeposition of a target material out of the electrolyte solution onto the deposition electrode, the deposition electrode is operable as a cathode while the electrode array is operable as an anode. The electrochemical additive manufacturing system also comprises one or more sensors configured to measure one or more characteristics of the electrolyte solution as well as one or more electrolyte-altering devices comprising one or more of a material injector, a thermal unit, and a filter and configured to change one or more characteristics of the electrolyte solution within the electrochemical additive manufacturing system based on one or more measurements of characteristics of the electrolyte solution. One or more characteristics of the electrolyte solution comprise one or more of an acid concentration, a feedstock ion concentration, a plating additive concentration, a temperature, and a flow rate.

In some examples, the electrochemical additive manufacturing system further comprises a second supply reservoir comprising a second electrolyte solution having a second composition, different from the composition of the electrolyte solution in the supply reservoir. The second supply reservoir is fluidically coupled to the electrodeposition cell.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

Various shortcomings of conventional additive manufacturing that involve metals have been addressed with electrochemical additive manufacturing systems and methods described herein. Specifically, metals and types of materials can be deposited from electrolyte solutions using specially-configured electrode arrays. An electrode array comprises individually-addressable electrode portions, arranged into a two-dimensional (2D) grid, such that each electrode portion can be individually turned on or off during the plating process thereby selectively controlling individual plating areas. Furthermore, one or more characteristics of the electrolyte solution can be changed in situ (within the electrochemical additive manufacturing system), e.g., in between deposition cycles or even during a portion of the deposition cycle. For example, the electrolyte solution having a first composition can be flowed into the gap between the electrode array and deposition electrode. Once the gap is filled with the solution and the height of the gap is at the desired level, a first electroplating cycle is performed using this solution. The solution may be then flushed from the gap, and the gap is refilled with electrolyte solution having a second composition, different from the first composition. The second electroplating cycle is performed using this modified solution. The electrolyte composition is just one example of characteristics that can be changed in situ. Other examples include temperature and flow rate. Furthermore, the electrolyte composition can be changed by changing the concentration of one or more components in the solution, e.g., an acid concentration, a feedstock ion concentration, a plating additive concentration, and the like.

These individually-addressable electrode portions and selective control of individual plating areas may be referred to as a localized electrodeposition (LECD) process, performed using an electrochemical additive manufacturing system. In some examples, the system utilizes a high-velocity fluid supply (e.g., a supply reservoir and/or a pump)

which can rapidly fill the gap between the electrode array and deposition electrode. Furthermore, the gap has a relatively small volume in comparison to the electrolyte flow rates. This is in stark contrast to conventional electrochemical systems, which often rely on a large fluid reservoir, inside which the workpieces and electrodes are submerged as will now be described with reference to FIGS. 1A and 1B.

Figure 1A:
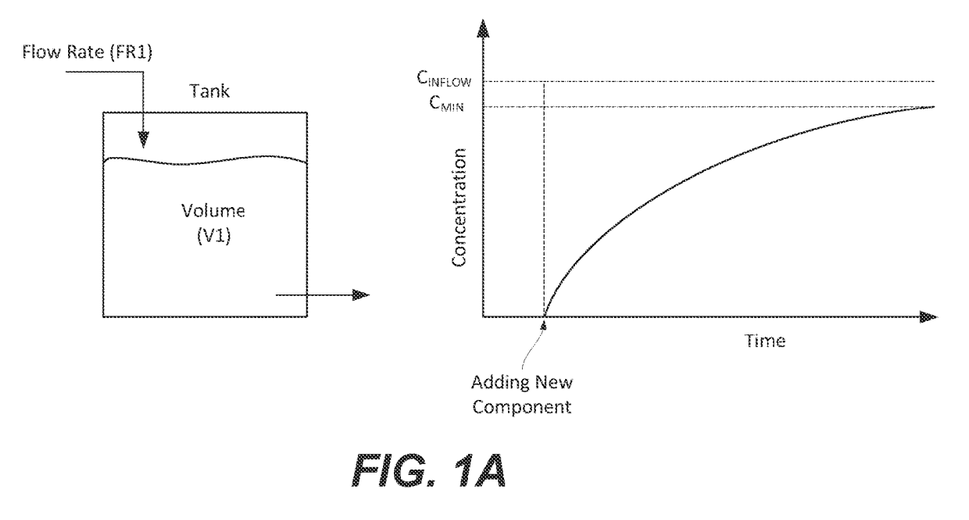
FIGS. 1A and 1B are schematic illustrations of concentration profiles in two different processing systems, in accordance with some examples.
Figure 1B:
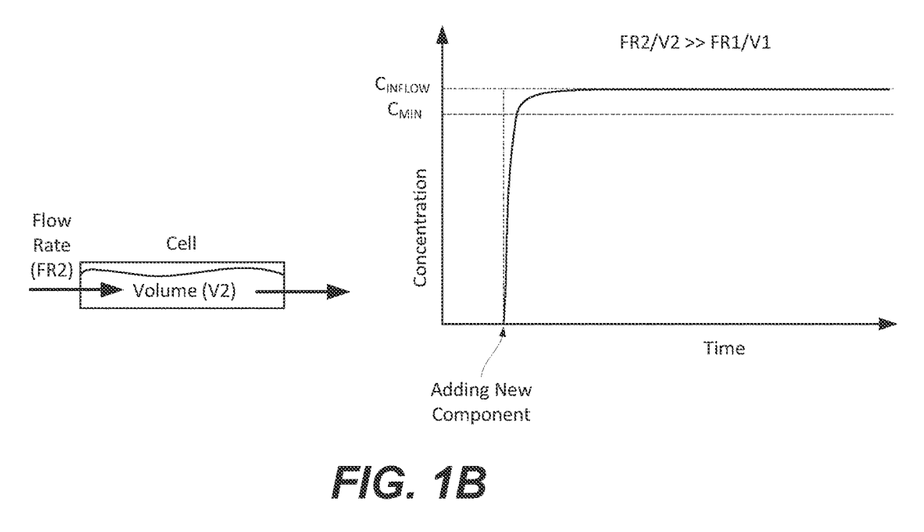

Specifically, FIG. 1A is a schematic illustration of the concentration profile in a conventional electrochemical system using a tank with a large processing volume (V1). If a new component is added to this tank as a part of the incoming stream, having a flow rate(FR1), then the concentration profile of this new component in the tank will depend on both the flow rate and the tank volume. The same relationship (flow rate and volume) is applied to the electrochemical additive manufacturing system, which has a concentration profile shown in FIG. 1B. However, with a smaller volume and faster flow rate, the changeover of the electrolyte solution in the electrodeposition cell is much faster as illustrated by a much steeper slope in the concentration profile. The gap volume in the electrodeposition cell of the electrochemical additive manufacturing system (described herein) can be 50-2,000 $mm^3$ (for a 100 mm×100 mm cell with a 0.005-0.2 mm gap). In fact, with such small gap volumes, the entire electrolyte solution may in some examples be replaced in between deposition cycles (as further described below) without concerns for transition concentrations.

In other words, a LECD process involves actively flowing and using the electrolyte solution in the process, which provides much tighter control. These controls can come from controlling the electrolyte solution in a supply reservoir (e.g., freshly fed solution, recycled solution, etc.). Additional controls can come from the specific routing of the electrolyte solution, e.g., through one or more electrolyte-altering devices, recycling back into the supply reservoir, and/or discarding into a collection reservoir. Further controls are provided by electrolyte-altering devices, such as material injectors, thermal units, and filters.

An electrochemical additive manufacturing system can also include an inlet pump for controlling the flow rate of the electrolyte solution from the supply reservoir into the electrodeposition cell. In some examples, the inlet pump is a part of electrolyte-altering devices. Furthermore, in some examples, the electrolyte solution is gravity fed from the supply reservoir without a need for a pump. Additional flow-rate control can be achieved by positioning a valve between the supply reservoir and the electrodeposition cell.

An electrochemical additive manufacturing system can handle an electrolyte in a closed-loop system (which may be also referred to as a multipass system), and an open-loop system (which may be also referred to as a single-pass system), can be switched between the closed-loop and open-loop modes, or can use these modes in parallel (e.g., by partially discharging the used solution, while recycling a portion of the used solution). For example, in a closed-loop system, the used solution can pass through a carbon or similar filter, which would strip organic additives or other organic molecules from the used solution. In another example, a particulate filter (e.g., sized for specific particle sizes) can be used for removing particles (e.g., used as plating additives). The filtered solution can then be returned to the supply reservoir for re-use. In some examples, new (different) additives can be introduced to this filtered solution (e.g., mixed in the supply reservoir). As noted above, the electrochemical additive manufacturing system can be switched between the closed-loop and open-loop modes using one or more valves, e.g., a three-way valve controlling the flows to the supply reservoir and, separately, to the collection reservoir.

In some examples, an electrochemical additive manufacturing system is configured for the self-maintenance of the solution. For example, water (or another solvent) can evaporate from the electrolyte solution over time. A sensor can detect this loss and instruct, through a system controller, a corresponding electrolyte-altering device to replenish the water (or other solvents). A similar replenishment can be performed on various other components, e.g., feedstock ions that are consumed during the electroplating. Depending on the makeup of the electrodes and the deposition conditions, additive compounds may be consumed or damaged. This can be sensed or calculated, and the appropriate amount of additive dosed back into the solution, either in a closed-loop control system by detecting when the compounds are degraded or consumed using one or more analytic techniques described below, or in an open-loop control system using estimates.

Furthermore, one or more characteristics of the electrolyte solution can be changed during the deposition of the same target material. For instance, a specific acid concentration or a metal ion concentration (or, more generally, a feedstock ion concentration) could be determined for the first deposition cycles (layers). These concentrations (or other characteristics of the electrolyte solution) can be used to achieve various preferred compositions and other properties of the target material (the deposit). As the deposition (build) progresses, the concentration of these materials can be varied or eliminated to modify or support various electrochemical deposition process goals, such as resolution, part density, and print speed.

In some examples, electrochemical additive manufacturing systems described herein can be used for the deposition of alloys. For example, when depositing a binary alloy, the concentration of each metal ion in the solution can be determined and adjusted to ensure the correct final alloy composition. This could also be used to change the alloy composition throughout the deposition as desired. Temperature, acid, flow rate, and additives can also influence the alloy composition.

Examples of Electrochemical Additive Manufacturing Systems

Figure 2A:
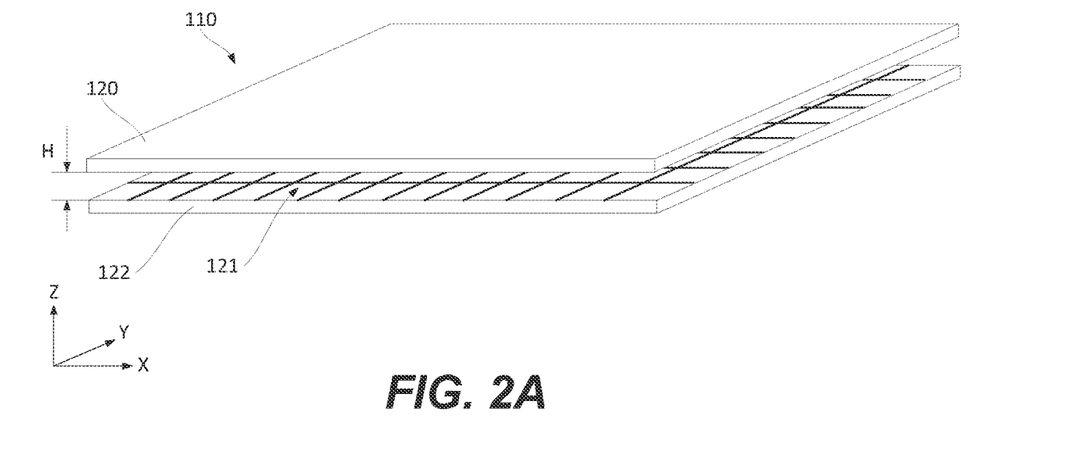
FIG. 2A is a perspective schematic view of an electrodeposition cell comprising an electrode array and a deposition electrode, in accordance with some examples.

FIG. 2A is a perspective schematic view of electrodeposition cell 110 comprising electrode array 122 and deposition electrode 120, in accordance with some examples. Electrodeposition cell 110 is a primary component of electrochemical additive manufacturing system 100, further described below with reference to FIGS. 3A-3E. Besides electrode array 122 and deposition electrode 120, electrodeposition cell 110 can include various additional components, for example, those that are described below with reference to FIG. 2C.

Referring to FIG. 2A, deposition electrode 120 and electrode array 122 form gap 121, which is filled (partially or fully) with an electrolyte solution during the operation of electrodeposition cell 110. The height (H) of gap 121 is specifically controlled as the height influences the deposition conditions. For example, an excessive gap height can result in lower deposition rates and less control over the deposition locations. On the other hand, a gap height below the target value can cause excessive deposition rates and even shorts. In some examples, the height (H) of gap 121 can vary between 5 micrometers and 200 micrometers. It should be noted that the height gap can be different at different portions of the deposition electrode 120 and electrode array 122 as further described below with reference to FIG. 2C. Furthermore, the average gap height can change between various deposition and electrolyte flow stages, which is also described below.

Figure 2B:
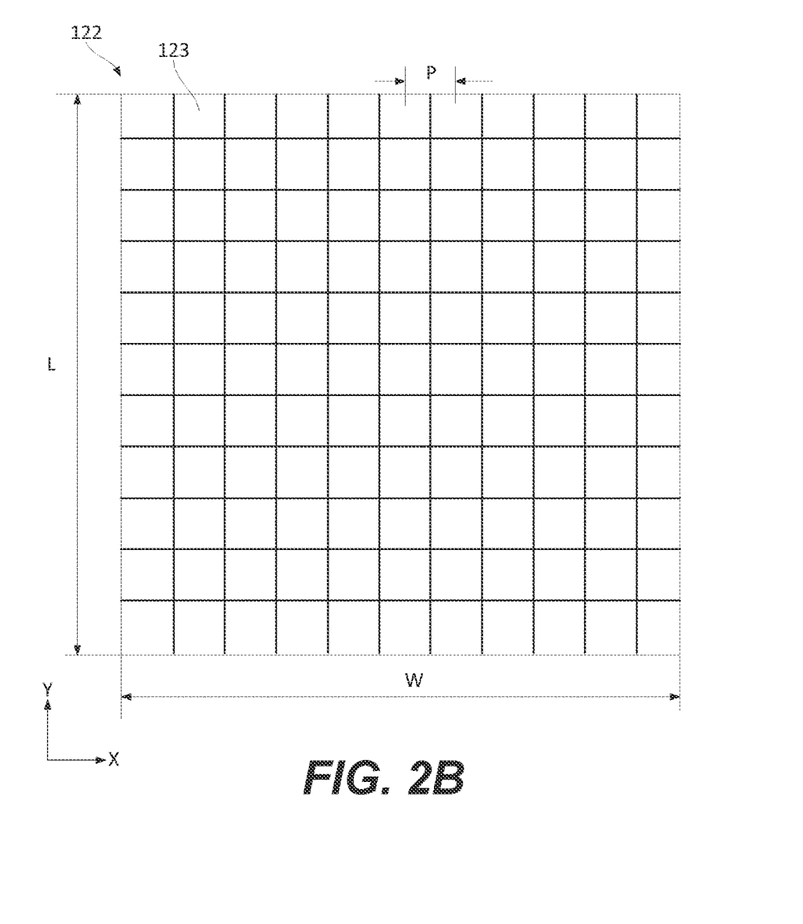
FIG. 2B is a top schematic view of a rectangular electrode array, comprising individually-addressable electrode portions, of FIG. 2A, in accordance with some examples.

Referring to FIG. 2B, electrode array 122 comprises individually-addressable electrode portions 123, which may be also referred to as grid regions. More specifically, electrodeposition cell 110 allows applying individual voltages (relative to deposition electrode 120) to each of individually-addressable electrode portions 123. This individually-addressable feature allows achieving different deposition rates at different locations on deposition electrode 120. Individually-addressable electrode portions 123 form a deposition grid, in which these portions may be offset relative to each other along the X-axis and Y-axis. The grid may be characterized by a grid X-axis resolution (corresponding to the number of grid regions along the X-axis), grid Y-axis resolution (corresponding to the number of grid regions along the Y-axis), grid X-axis pitch (corresponding to the length of each grid region along the X-axis), grid Y-axis pitch (corresponding to the length of a grid region along the Y-axis), overall grid pitch (corresponding to the minimum of the grid X-axis pitch and the grid Y-axis pitch), and grid region area. In some examples, one or both of the grid X-axis resolution and the Y-axis resolution is between 50 and 500, such as between 75 and 250. In the same or other examples, one or both of the grid X-axis pitch and the Y-axis pitch are 100 micrometers or less, 50 micrometers or less, or even 35 micrometers or less. Other example grids include triangular, hexagonal, or other patterns that partially or totally tessellate a surface.

Figure 2C:
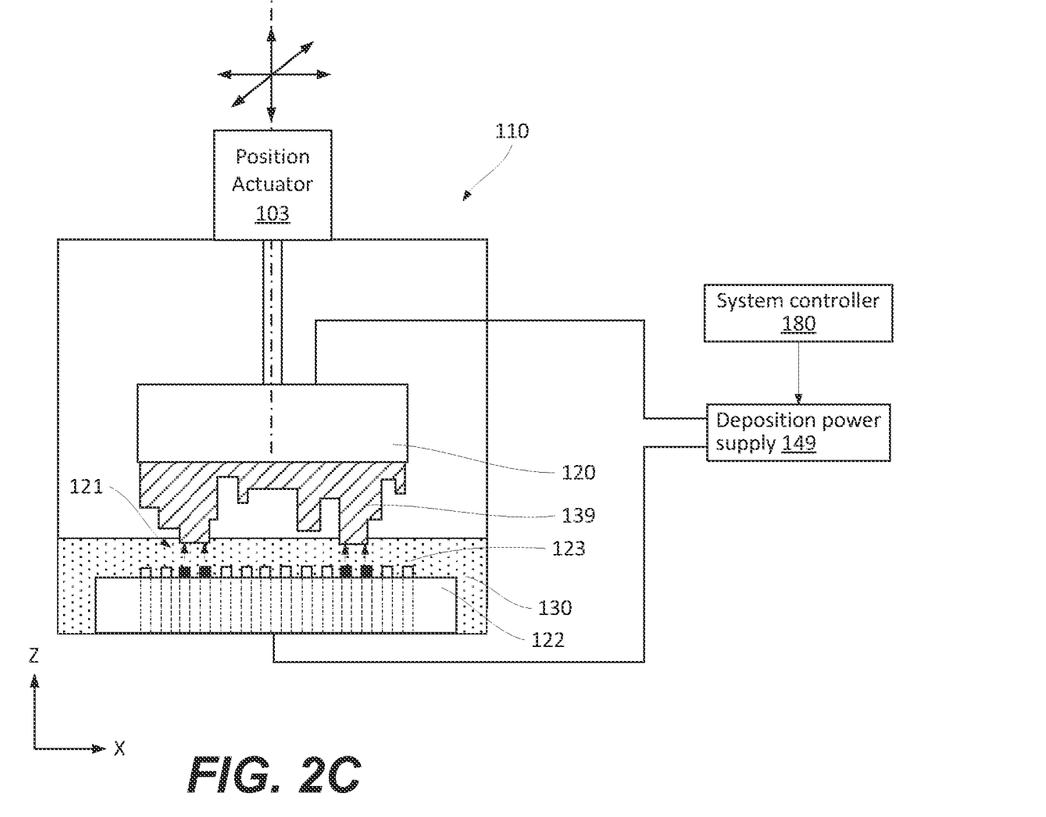
FIG. 2C is a side schematic view of an electrodeposition cell showing various additional components, in accordance with some examples.

Referring to FIG. 2C, electrodeposition cell 110 comprises deposition power supply 149, which in turn comprises a grid control circuit, a power distribution circuit, and an array of deposition elements aligned with the deposition grid. The grid control circuit may be arranged as a matrix of an array of row traces and an array of column traces, with a row driver circuit electrically connected to each row trace, and a column driver circuit electrically connected to each column trace. Each deposition element may correspond to a unique grid region of the deposition grid; it may have a deposition anode and a deposition control circuit.

In some examples, individually-addressable electrode portions 123 are formed from an insoluble conductive material, such as platinum group metals and their associated oxides, doped semiconducting materials, and carbon nanotubes. Each deposition control circuit may be connected to the corresponding one of individually-addressable electrode portions 123. The deposition control circuit controls the conductivity or the amount of current flowing through the corresponding portion. When the exposed surface of a portion is in contact with the electrolyte, the current may cause an electrochemical deposition reaction on the deposition electrode (operable as a cathode in this example). In some examples, the current density supplied to individually-addressable electrode portions 123 can be up to 125 mA per square centimeter or more, such as 250 mA or more, 500 mA or more, 750 mA or more, or even 1 A per square centimeter or more. However, lower current densities are also within the scope.

In some examples, a deposition control circuit may have a first switching element controlled by the row trace, and a second switching element controlled by the column trace when the first switching element is active. The second switching element may control the amount of current flowing to each of individually-addressable electrode portions 123. The switching elements may be, for example, thin film transistors, such as made from low-temperature polycrystalline silicon or indium gallium zinc oxide. In the same or other examples, a deposition control circuit may also have a storage capacitor that is charged when the first switching element is active and when the associated column trace is energized. The storage capacitor may maintain the state of the second switch element after the first switching element is deactivated.

FIG. 2C is a side schematic view of an example electrodeposition cell 110 showing various additional components, such as position actuator 103. Position actuator 103 is coupled to deposition electrode 120 (as shown in FIG. 2C) and/or electrode array 122 and is used to change at least the height of gap 121 between deposition electrode 120 and electrode array 122 (e.g., move deposition electrode 120 relative electrode array 122 along at least the Z-axis). In some examples, position actuator 103 can also change the relative position of deposition electrode 120 and/or electrode array 122 in one or more additional axes.

During the operation, electrode array 122 and deposition electrode 120 or, more specifically, target material 139 are placed into electrolyte solution 130. Electrochemical reactions may then cause the plating of target material 139. The deposition areas are controlled by controlling the current through each individually-addressable electrode portion 123. For example, FIG. 2C illustrates black portions representing activated portions (through which the current is transmitted) and white portions representing non-activated portions (through which the current is not transmitted). As such, only parts of target material 139 that face the activated portions receive new deposits. The current can be modified by activating and deactivating different portions in electrode array 122 to achieve intricate and detailed shapes. It should be noted that additional control can be provided by selectively submerging different parts of target material 139 to electrolyte solution 130, such that the deposition can only occur on the submerged parts.

Also shown in FIG. 2C is electrolyte solution 130 at least partially filling gap 121 between deposition electrode 120 and electrode array 122. In some examples, the position of deposition electrode 120 relative to electrode array 122 is controlled in such a way that only a portion of target material 139 is submerged into electrolyte solution 130, which can be used as an additional control over the deposition location. In some examples, deposition electrode 120 is positioned above electrode array 122 (as shown in FIG. 2C), while in some examples their positions are rotated from that orientation. For example, deposition electrode 120 may be positioned below or to the side of electrode array 122.

Figure 3A:
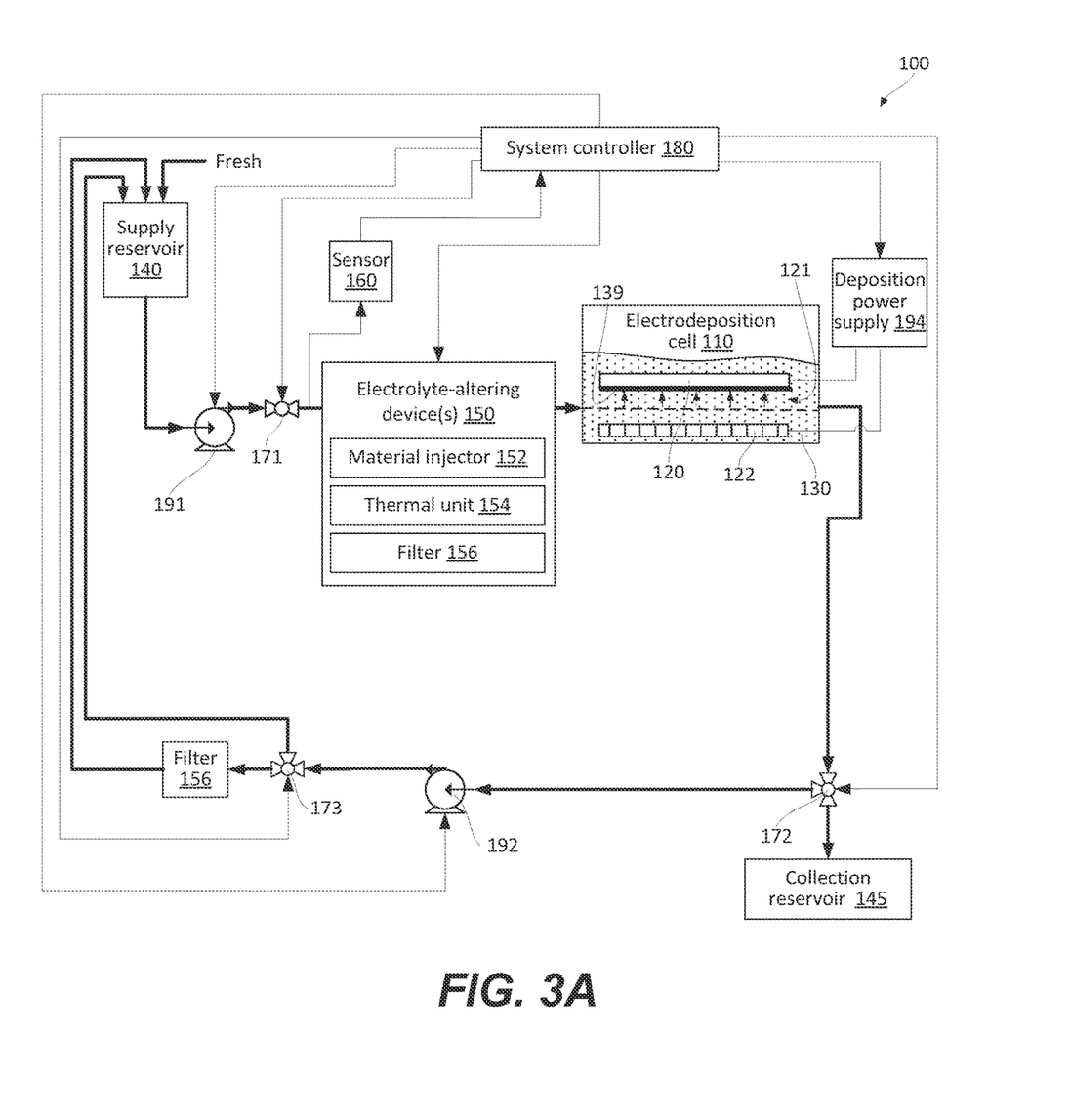
FIG. 3A is a schematic flow diagram of an electrochemical additive manufacturing system, in accordance with some examples.

FIG. 3A is a schematic flow diagram of electrochemical additive manufacturing system 100, in accordance with some examples. Electrochemical additive manufacturing system 100 comprises supply reservoir 140 and electrodeposition cell 110, fluidically coupled to supply reservoir 140. Various examples of electrodeposition cell 110 are described above with reference to FIGS. 2A-2C. Electrochemical additive manufacturing system 100 also comprises one or more electrolyte-altering devices 150, which are configured to change one or more characteristics of electrolyte solution 130 within electrochemical additive manufacturing system 100. Some examples of these characteristics include, but are not limited to, the acid concentration, feedstock ion concentration, additive concentration, temperature, and flow rate.

These and other components of electrochemical additive manufacturing system 100 will now be described in more detail.

Supply reservoir 140 can be in the form of a tank and is operable to store electrolyte solution 130. In some examples, a fresh solution is added first into supply reservoir 140, e.g., to compensate for any component losses in electrolyte solution 130 during the deposition. Furthermore, supply reservoir 140 can receive electrolyte solution 130 that has previously passed through electrodeposition cell 110, which may be referred to as a used electrolyte solution. In some examples, this used electrolyte solution can first pass through filter 156 before being returned to supply reservoir 140. For example, filter 156 can remove various components (e.g., deposition byproducts) from electrolyte solution 130 before returning electrolyte solution 130 to supply reservoir 140. Alternatively, this used electrolyte solution can be flowed directly from electrodeposition cell 110 into supply reservoir 140 without passing through any filters. The used electrolyte solution is combined with the fresh solution in supply reservoir 140. It should be noted that the composition and/or other characteristics of electrolyte solution 130 flowed from supply reservoir 140 can be different from that of electrolyte solution 130 flowed into electrodeposition cell 110 due to the changes to electrolyte solution 130 performed by one or more electrolyte-altering devices 150. Furthermore, it should be noted that the composition and/or other characteristics of electrolyte solution 130 flowed from supply reservoir 140 can be different from that of the fresh solution since the fresh solution can be combined with another solution (e.g., used solution) in supply reservoir 140. Similarly, it should be noted that the composition and/or more other characteristics of electrolyte solution 130 flowed from supply reservoir 140 can be different from that of the used solution since the used solution can be combined with another solution (e.g., fresh solution) in supply reservoir 140. When multiple different types of electrolytes are added to supply reservoir 140 (e.g., fresh and used solutions), supply reservoir 140 can be equipped with a mixer to combine these electrolytes into a homogeneous mixture.

The flow of electrolyte solution 130 from supply reservoir 140 into electrodeposition cell 110 can be controlled by one or more valves (e.g., valve 171) and/or pumps (e.g., inlet pump 191). These flow control devices may be, in turn, controlled by system controller 180. For example, system controller 180 can shut down the flow of electrolyte solution 130 into electrodeposition cell 110 during one operation (e.g., during the deposition when gap 121 is small) and restart the flow during another operation (e.g., when gap 121 is increased). Furthermore, the flow rate through electrodeposition cell 110 can be changed depending on various factors (e.g., solution's viscosity, deposition rates).

In some examples, electrolyte solution 130 is directed through electrolyte-altering device 150 before being flowed into electrodeposition cell 110. Alternatively, electrolyte-altering device 150 is positioned downstream from electrodeposition cell 110, e.g., for treating used/spent solution. Furthermore, electrochemical additive manufacturing system 100 can comprise multiple electrolyte-altering devices 150 positioned at different locations along the flow path.

Some examples of electrolyte-altering devices 150 include, but are not limited to, material injector 152, thermal unit 154, and filter 156. As noted above, electrolyte-altering devices 150 are configured to change one or more characteristics of the electrolyte solution 130, such as an acid concentration, a feedstock ion concentration, a plating additive concentration, a temperature, and a flow rate. For example, the acid concentration can have a major impact on various properties of target material 139 and the conductivity of electrolyte solution 130. Furthermore, various examples of plating additives 134 require a specific acidity range (pH range). The acid concentration (represented by a pH range) can be increased or lowered by acid and/or base dosing, e.g., using one or more material injectors 152. For example, electrolyte-altering devices 150 can include one material injector 152 filled with an acid (to increase the acid concentration) and another material injector 152 filled with a base (to decrease the acid concentration).

The feedstock ion concentration (e.g., the metal ion concentration) is controlled to account for depletion during the electrodeposition. Specifically, feedstock ions are consumed to form target material 139. These ions can be replenished by introducing one or more salts (e.g., in the form of concentrated salt solutions that can be also referred to as feedstock concentrates). For example, one or more material injectors 152 filled with feedstock concentrates can be fluidically coupled with a pathway taken by electrolyte solution 130 in electrochemical additive manufacturing system 100. In some examples, feedstock ions can be replaced (gradually or abruptly) with different feedstock ions, e.g., to deposit different types/compositions of target material 139. For example, a bottom portion of target material 139 can be formed from copper, while the top portion can be formed from nickel. Specifically, multiple material injectors 152 filled with different feedstock concentrates can be used in electrochemical additive manufacturing system 100. In some examples, switching between different feedstock concentrates is performed multiple times. Furthermore, multiple feedstock concentrates may be introduced into electrolyte solution 130 at the same time, e.g., to form alloys.

The plating additive concentration can vary, e.g., depending on plating stages. For example, material injector 152 can be used to introduce a brightener additive at the end of the plating process, e.g., promote a shinier deposit on the exterior/top of target material 139 to improve the surface finish.

As noted in other parts of this disclosure, filter 156 can be used for the selective removal of various components from electrolyte solution 130, e.g., organic additives using a carbon filter and/or particulate additives using a sieve filter.

The temperature can be controlled using thermal unit 154, which can be a heater and/or a chiller. For example, nickel plating may require electrolyte solution 130 to be at temperatures above room temperature. Furthermore, electrolyte solution 130 can be chilled, e.g., to remove heat added by one or more pumps and electrodeposition cell 110.

In some examples, the flow rate could be changed depending on the size of target material 139 (e.g., the part being printed). For example, a smaller part may need a lower flow rate. As the deposition continues and the part size increases, the flow rate can be increased (e.g., to provide more feedstock ions for more deposition). For example, electrolyte-altering devices 150 can include inlet pump 191 and/or inlet valve 171.

Overall, material injector 152 may be used to introduce one or more materials into electrolyte solution 130. Some examples of material injectors 152 include, but are not limited to, a syringe pump, an injector, a solid-particle delivery device, etc. Thermal unit 154 may be used to heat or cool electrolyte solution 130. For example, heating electrolyte solution 130 helps to reduce its viscosity. Some examples of thermal units 154 include, but are not limited to, resistive heaters, etc. Filter 156 may be used to remove one or more components from electrolyte solution 130. Some examples of filters 156 include, but are not limited to, carbon filters, particulate filters, etc.

The operation of electrolyte-altering devices 150 as well as other components, such as electrodeposition cell 110, is controlled using system controller 180. For example, system controller 180 can provide instructions to each deposition control circuit 102 to activate/deactivate each one of individually-addressable electrode portions 123. System controller 180 can include a microcontroller, a microprocessor, a Graphics Processing Unit (GPU), a Field-Programmable Gate Array (FPGA), a System-On-Chip (SoC), a single-board computer, a laptop, a notebook, a desktop computer, a server, or a network or combination of any of these devices. System controller 180 may communicate with various other components, such as sensor 160. One or more sensors 160 can be positioned upstream from electrodeposition cell 110 (before (as shown in FIG. 3A) and/or after electrolyte-altering devices 150), inside electrodeposition cell 110, downstream from electrodeposition cell 110, inside supply reservoir 140, and/or other locations. Sensor(s) 160 may be used to measure the deposition progress and/or the state of the electrolyte. Some examples of such sensors include but are not limited to current sensors, voltage sensors, timers, cameras, rangefinders, scales, force sensors, temperature sensors, conductivity sensors, color sensors, and pressure sensors.

In some examples, electrochemical additive manufacturing system 100 comprises collection reservoir 145, e.g., positioned downstream from electrodeposition cell 110. Collection reservoir 145 can be used for collecting a used electrolyte solution, e.g., if this used electrolyte solution can not be recycled/reconditioned. In some examples, the flow into collection reservoir 145 is controlled by second valve 172, which is operable by system controller 180.

In some examples, electrochemical additive manufacturing system 100 comprises inlet pump 191 and/or return pump 192 for maintaining the flow through electrochemical additive manufacturing system 100. In some examples, inlet pump 191 and/or return pump 192 is a part of electrolyte-altering devices 150 and is used for controlling the flow through electrodeposition cell 110.

Figure 3B:
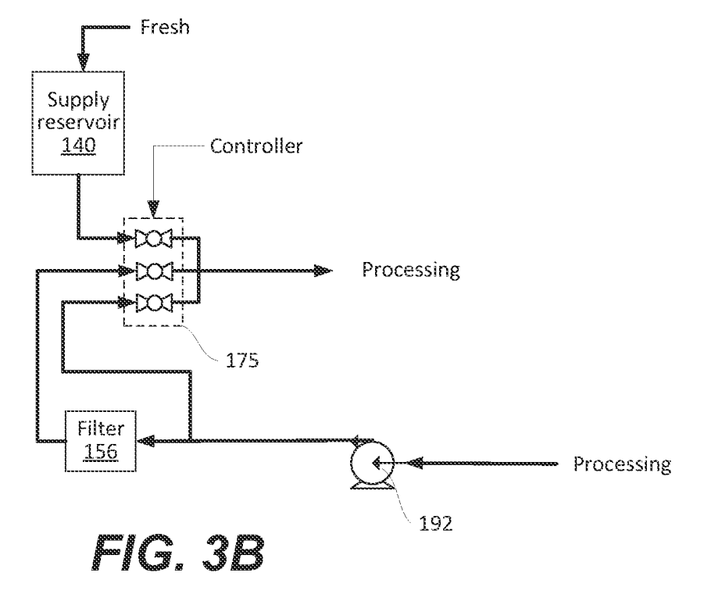
FIGS. 3B and 3C are schematic flow diagrams of additional examples illustrating additional connection options for a supply reservoir, in accordance with some examples.
Figure 3C:
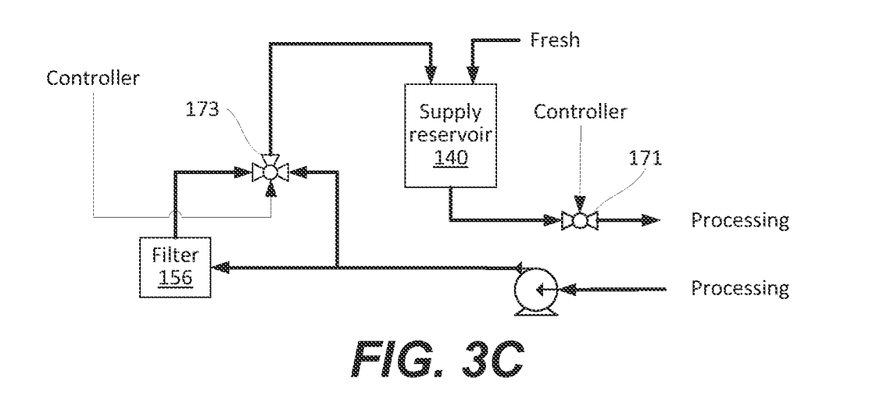

FIGS. 3B and 3C are schematic flow diagrams of additional examples showing various connections to supply reservoir 194, in accordance with some examples. Specifically, FIG. 3B illustrates using valve system 175 comprising three individually controlled valves. The first valve controls the flow of the fresh solution from supply reservoir 194 to processing components (e.g., electrolyte-altering device 150 and electrodeposition cell 110). In the illustrated example, a used solution is not fed back into supply reservoir 194. However, alternative examples where either a previously filtered used solution and/or a non-filtered used solution is fed into supply reservoir 194. Returning to the example in FIG. 3B, the second valve controls the flow of a filtered-used solution, while the third valve controls the flow of an unfiltered used solution to the processing components. As such, valve system 175 can selectively direct one or more of these three streams to the processing components. FIG. 3C illustrates three-way valve 173 that selectively controls the flow of a previously filtered used solution and/or a non-filtered used solution into supply reservoir 194, wherein these used solutions are mixed with the fresh solution before being flowed to the processing components.

Figure 3D:
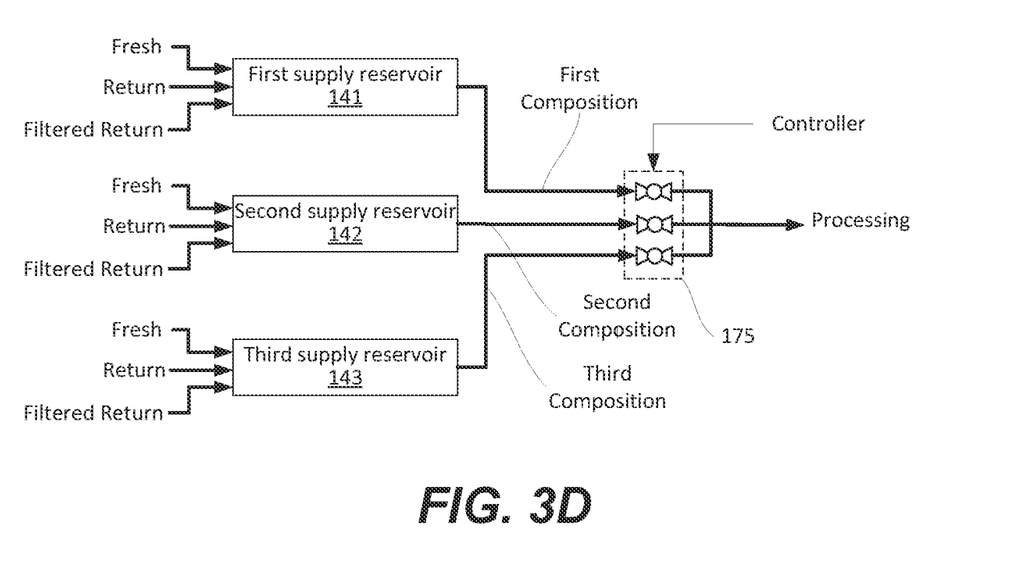
FIG. 3D is a schematic flow diagram illustrating multiple supply reservoirs used in the same electrochemical additive manufacturing system, in accordance with some examples.

FIG. 3D is a schematic flow diagram illustrating multiple supply reservoirs, in accordance with some examples. Specifically, first supply reservoir 141 can be used to supply electrolyte solution 130 having a first composition, second supply reservoir 142 can be used to supply electrolyte solution 130 having a second composition different from the first composition, and finally, third supply reservoir 143 can be used to supply electrolyte solution 130 having a third composition different from each of the first composition and the second composition. Each of these compositions can be formed using fresh solutions, unfiltered used/return solutions, and/or filtered used/return solutions. The flow from each supply reservoir can be controlled using valve system 175 comprising three individually controlled valves.

Figure 3E:
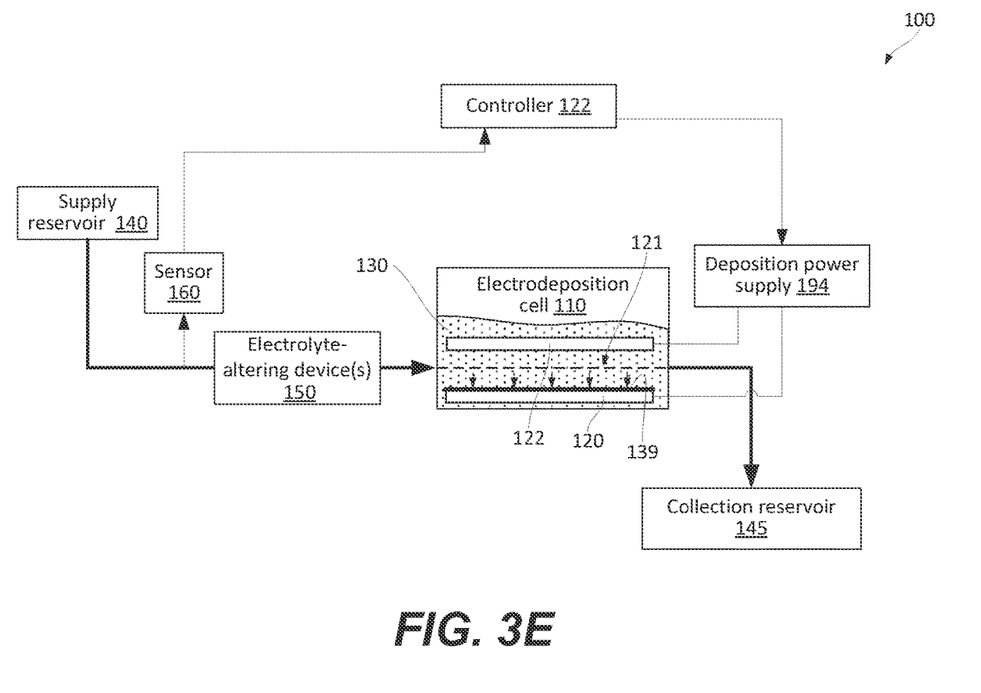
FIG. 3E is a schematic flow diagram of another example of the electrochemical additive manufacturing system.

FIG. 3E is a schematic flow diagram of another example of electrochemical additive manufacturing system 100, which may be referred to as an open-loop electrolyte system. In this example, the fresh electrolyte solution is flowed from supply reservoir 140 through electrolyte-altering device 150 into electrodeposition cell 110. Electrolyte-altering device 150 allows changing one or more characteristics of the fresh electrolyte solution, e.g., to cause the deposition changes in electrodeposition cell 110. In some examples, sensor 160 is used for sending one or more of these solution characteristics before (shown) and/or after (not shown) the solution passes through electrolyte-altering device 150 as, e.g., described above with reference to FIG. 3A. After the solution is used for deposition (in electrodeposition cell 110), the solution is discarded into collection reservoir 145. This open-loop electrolyte system example may be used when the used solution cannot be easily reconditioned and reused. While electrolyte-altering device 150 is not used for reconditioning (as in closed-loop examples), electrolyte-altering device 150 is used for modifying the fresh solution thereby eliminating the need for supply reservoirs. It should be noted that electrochemical additive manufacturing system 100 (which is illustrated in FIG. 3A) can be also configured to operate as an open-loop system, e.g., by switching three-way valve 172 to direct the flow from the return line into collection reservoir 145.

Figure 4:
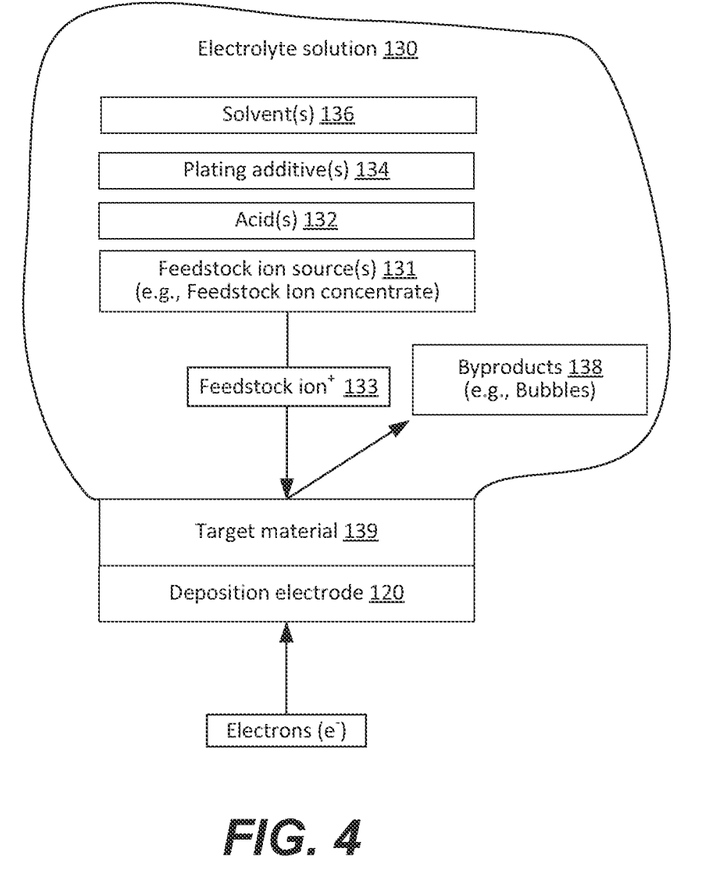
FIG. 4 is a schematic block diagram illustrating various material transformations within the electrochemical additive manufacturing system at the interface of the electrolyte solution and the deposition electrode, in accordance with some examples.

FIG. 4 is a schematic block diagram illustrating various material transformations within electrochemical additive manufacturing system 100 or, more specifically, at the interface of electrolyte solution 130 and deposition electrode 120. It should be noted that once target material 139 is initially deposited, electrolyte solution 130 interfaces target material 139, which separates electrolyte solution 130 from deposition electrode 120.

In some examples, electrolyte solution 130 comprises one or more feedstock ion sources 131 that generate ions or, more specifically, cations that are used to form target material 139 when combined with electrons on deposition electrode 120. While FIG. 4 illustrates metal cations (e.g., copper ions, nickel ions, tungsten ions, gold ions, silver ions, cobalt ions, chrome ions, iron ions, and tin ions), other types of cations are within the scope (e.g., polymers such as polypyrrole. Some specific examples of feedstock ion sources 131 include, but are not limited to, copper sulfate, copper chloride, copper fluoroborate, copper pyrophosphate, copper cyanide, nickel sulfate, nickel ammonium sulfate, nickel chloride, nickel fluoroborate, zinc sulfate, sodium thiocyanate, zinc chloride, and ammonium chloride. In some examples, feedstock ion sources 131 or other sources of cations (e.g., salts) are referred to as material concentrates.

In some examples, the solvent is selected from the group consisting of water, molten salts (e.g., LiCl—KCl, NaCl—KCl, LiF—NaF—KF, LiF—CaF2, sulfonium [R3S]+ based salts, and phosphonium [R3P]+ based salts), organic solvents (e.g., aromatic, dimethylsulfone, acetone and acetates), ionic liquids (e.g., quaternary ammonium salts (tetraalkylammonium), [R4N]+ based, cyclic amines: aromatic (pyridinium, imidazolium) and saturated (piperidinium, pyrrolidinium) ones).

In some examples, electrolyte solution 130 comprises one or more acids 132, such as sulfuric acid, acetic acid, hydrochloric acid, nitric acid, hydrofluoric acid, boric acid, citric acid, and phosphoric acid. In some examples, electrolyte solution 130 comprises one or more additives 134, such as an accelerator, a suppressor, a brightener, a grain refiner, a leveler, particulates for co-deposition (e.g., nanoparticles and microparticles such that diamond particles, tungsten particles, chromium particles, and silicon carbide particles).

The deposition of target material 139 may also produce various byproducts 138, e.g., bubbles. Byproducts 138 can be removed either by removing the entire electrolyte solution 130 (e.g., to collection reservoir 145) or selectively (e.g., by passing used electrolyte solution 130 through filter 156).

Examples of Methods of Electrochemical Additive Manufacturing

Figure 5:
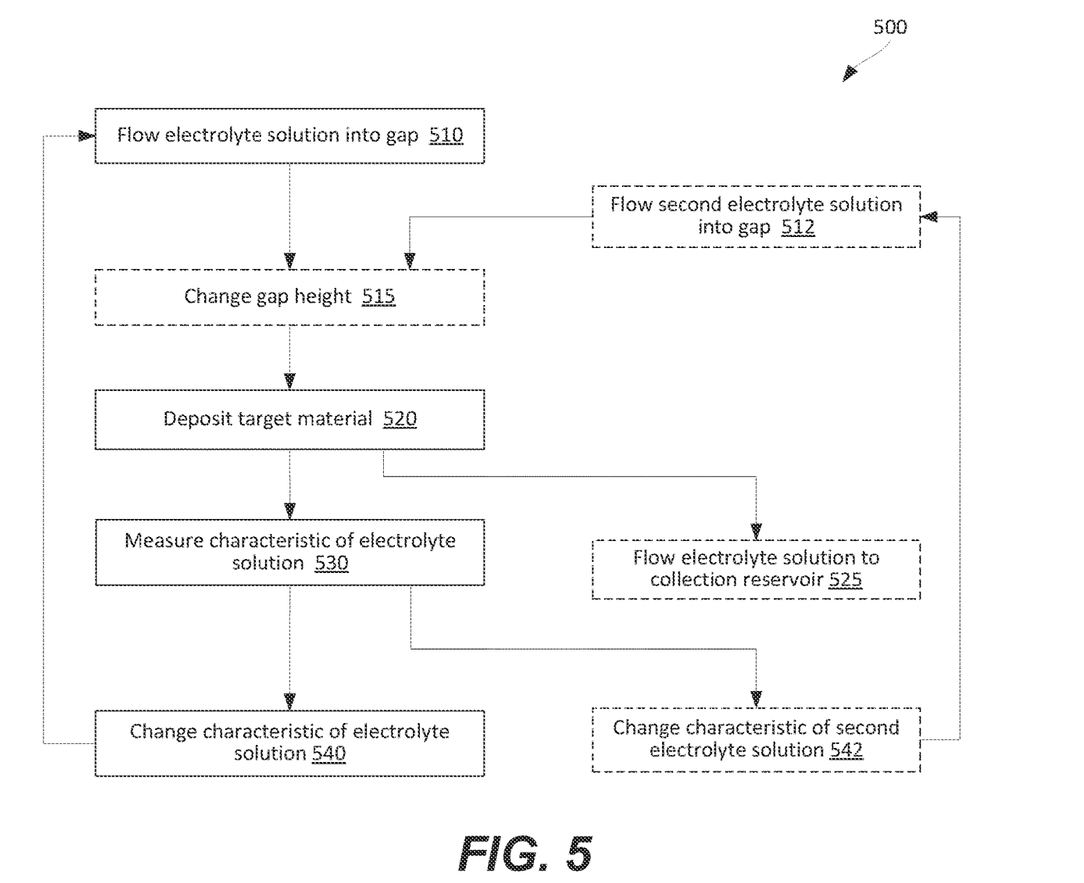
FIG. 5 is a process flowchart corresponding to a method of electrochemical additive manufacturing using an electrochemical additive manufacturing system, in accordance with some examples.

FIG. 5 is a process flowchart corresponding to method 500 of electrochemical additive manufacturing using electrochemical additive manufacturing system 100, in accordance with some examples. Various examples of electrochemical additive manufacturing system 100 are described above. Specifically, electrochemical additive manufacturing system 100 comprises electrodeposition cell 110, which in turn comprises electrode array 122 (comprising individually-addressable electrode portions 123) and deposition electrode 120.

In some examples, method 500 comprises (block 510) flowing electrolyte solution 130 into gap 121, formed by electrode array 122 and deposition electrode 120 of electrodeposition cell 110. As noted above, gap 121 can be specifically controlled to ensure the desired flow conditions through electrodeposition cell 110 and the desired deposition conditions. As noted above, the flow rate can be controlled by inlet pump 191 and/or inlet valve 171. The flow rate can be changed during the overall deposition process, e.g., increased as the deposition surface increases. In some examples, the flow rate is controlled based on the concentration of feedstock ions inside electrodeposition cell 110 or in the stream exiting electrodeposition cell 110.

In some examples, the height of gap 121 varies when electrolyte solution 130 is flowed into gap 121 and when target material 139 is deposited. In these examples, method 500 comprises (block 515) changing the height of gap 121 in between these two operations. For example, gap 121 has a first height value when flowing electrolyte solution 130 into gap 121. Thereafter, gap 121 has a second height value during electrodeposition of target material 139. The first height value is greater than the second height value. This gap increased during the electrolyte flow stage helps to fill electrodeposition cell 110 with the fresh electrolyte solution by reducing the flow restriction. On the other hand, reducing the gap height during the plating helps to control the current flow between electrode array 122 and deposition electrode 120, especially when individually-addressable electrode portions 123 are used selectively, e.g., with some portions activated, while the remaining portions being deactivated. For example, the gap height can be less than 1 millimeter during the plating operation and at least 2 millimeters during the electrolyte flushing operation, or even at least 5 millimeters.

Alternatively, the height of gap 121 is the same when electrolyte solution 130 is flowed into gap 121 and when target material 139 is deposited. For example, these two operations can be performed concurrently (e.g., as a part of the continuous plating process). It should be noted that in this example, the flow rate can be varied without shutting down the flow completely.

Referring to FIG. 3A, in some examples, electrolyte solution 130 is flowed into gap 121 from supply reservoir 140. Upon passing through electrodeposition cell 110 and exiting gap 121, electrolyte solution 130 can be recirculated back into supply reservoir 140. For example, electrochemical additive manufacturing system 100 can be a closed-loop electrolyte system. Alternatively, used electrolyte solution 130 can be flowed (block 525) to collection reservoir 145 in an open-loop electrolyte system. In some examples, the switch between the closed-loop system and the open-loop system can be performed based on sensing one or more parameters of electrolyte solution 130 as electrolyte solution 130 exists electrodeposition cell 110 (e.g., to determine whether electrolyte solution 130 can be reconditioned). In some examples, the switch between the closed-loop system and the open-loop system can be performed based on new plating requirements, e.g., switching from one feedstock type to another feedstock type.

Referring to an example in FIG. 3D illustrating multiple supply reservoirs, in some examples, method 500 further comprises (block 512) flowing a second electrolyte solution from second supply reservoir 142 into gap 121. In these examples, target material 139 is deposited using the second electrolyte solution. For example, the second electrolyte solution can have a different composition (e.g., different feedstock ions) than electrolyte solution 130 and can be used to deposit target material 139 having different characteristics (e.g., composition, morphology). Referring to FIG. 3D, in some examples, method 500 further comprises recirculating the second electrolyte solution back into second supply reservoir 142, after the second electrolyte solution has exited gap 121. In some examples, method 500 further comprises changing one or more characteristics of the second electrolyte solution. Some examples of these characteristics include but are not limited to the acid concentration, feedstock ion concentration, additive concentration, temperature, and flow rate.

In some examples, method 500 comprises (block 520) depositing target material 139 onto deposition electrode 120 from electrolyte solution 130. This deposition is performed by flowing a current between electrode array 122, operating as an anode during this operation, and deposition electrode 120, operating as a cathode during this operation. In some examples, flowing the current between electrode array 122 and deposition electrode 120 is caused by selectively applying a voltage/flowing current between deposition electrode 120 and each of individually-addressable electrode portions 123, which is described above with reference to FIGS. 2A-2C, In some examples, method 500 further comprises (block 530) measuring one or more characteristics of electrolyte solution 130 (e.g., using sensor 160) thereby producing a measured value. The characteristic of electrolyte solution 130 can be changed (as described below) based on this measured value of the characteristic of electrolyte solution 130. For example, the characteristic of electrolyte solution 130 is measured using one or more of a timer, a thermocouple, a pH meter, an ultraviolet and visible light range (UV-Vis) spectrometer, an inline process mass spectrometer, a high-performance liquid chromatography device (HPLC), a cyclic voltammetric stripping (CVS) device, or a potentiostat, all of which are examples of sensors 160. In some examples, the characteristic is measured before electrolyte solution 130 enters gap 121. Alternatively, the characteristic is measured after electrolyte solution 130 has exited gap 121.

In some examples, method 500 comprises (block 540) changing the characteristic of electrolyte solution 130 within electrochemical additive manufacturing system 100. This changed characteristic can be one or more of the acid concentration, feedstock ion concentration, additive concentration, temperature, and flow rate. Various reasons for changing these characteristics are presented above. The characteristics can be changed using one or more electrolyte-altering devices 150, positioned along the pathway of electrolyte solution 130 in electrochemical additive manufacturing system 100. It should be noted that these characteristics are changed without removing (e.g., flushing out) electrolyte solution 130 from electrochemical additive manufacturing system 100. Furthermore, in some examples, these characteristics are changed while electrochemical additive manufacturing system 100, e.g., the deposition of target material 139 continues.

In some examples, the characteristic of electrolyte solution 130 is changed prior to flowing electrolyte solution 130 into gap 121, e.g., as schematically shown by an arrow from block 540 to block 510 in FIG. 5. For example, electrolyte-altering devices 150 can be positioned upstream from electrodeposition cell 110 to change the characteristics of electrolyte solution 130 flowed from supply reservoir 140. These changes may be triggered by requiring different characteristics for the deposition process (e.g., changing the type of target material 139 being deposited) and/or triggered by changing characteristics of electrolyte solution 130 in supply reservoir 140 (e.g., solvent evaporation, recycling used solution, etc.). Alternatively, the characteristic of electrolyte solution 130 is changed while electrolyte solution 130 is in gap 121, for example using microfluidic injection.

In some examples, two or more characteristics are changed at the same time. For example, the acid concentration can be changed together with the feedstock ion concentration. For example, the feedstock ion concentration may become depleted at the same time that a brightening additive may be desired.

In some examples, electrodeposition cell 110 has a volume filled with electrolyte solution 130. Electrolyte solution 130 is flowed at a volumetric flow rate through electrodeposition cell 110. A large flow rate ensures fast replacement of electrolyte solution 130 within electrodeposition cell 110 thereby maintaining the desired characteristics of electrolyte solution 130 as components (e.g., feedstock ions 133) are being consumed from electrolyte solution 130 and other components (e.g., byproducts 138) are being released into electrolyte solution 130 during the plating.

In some examples, changing the characteristic of electrolyte solution 130 is performed using electrolyte-altering device 150, such as material injector 152, thermal unit 154, and filter 156. For example, material injector 152 can change the characteristic of electrolyte solution 130 by injecting one or more of a solvent, an acid, an electrolyte concentrate, and a plating additive into electrolyte solution 130. In some examples, electrolyte-altering device 150 is filter 156. Filter 156 can change the characteristic of electrolyte solution 130 by removing a plating additive from electrolyte solution 130. Various examples of electrolyte-altering devices 150 and their functionalities are described above. In some examples, the flow of electrolyte solution 130 through filter 156 is selectively controlled using a valve, e.g., valve 173 shown in FIG. 3A.

When the second electrolyte solution is used, method 500 may comprise (block 542) changing the characteristic of this second electrolyte solution. These changes can be performed in a manner similar to electrolyte solution 130 described above, e.g., using one or more electrolyte-altering devices 150, positioned along the pathway of the second electrolyte solution. Furthermore, method 500 may comprise switching from electrolyte solution 130 to the second electrolyte solution.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

What is claimed is:

1. A method of electrochemical additive manufacturing using an electrochemical additive manufacturing system comprising an electrodeposition cell formed by an electrode array and a deposition electrode, the method comprising:
    flowing an electrolyte solution into and through a gap formed by the electrode array, comprising individually-addressable electrode portions, and the deposition electrode, wherein:
        the individually-addressable electrode portions are arranged in a two-dimensional grid defined by an electrode array plane,
        the electrolyte solution enters the gap through an inlet and exits the gap through an outlet, and
        the inlet is separated from the outlet by the two-dimensional grid such that the electrolyte solution flows through the gap in a direction substantially parallel to the electrode array plane while contacting the individually-addressable electrode portions;
    depositing a target material onto the deposition electrode from the electrolyte solution by flowing a current between a subset of the individually-addressable electrode portions of the electrode array in a direction substantially perpendicular to the electrolyte solution flow onto the deposition electrode, operating as a cathode, wherein the subset of the individually-addressable electrode portions is selected based on a desired location of the target material on the deposition electrode,
    measuring one or more characteristics of the electrolyte solution thereby producing one or more measured values, wherein the one or more characteristics comprise a current through the electrolyte solution; and
    changing the one or more characteristics of the electrolyte solution within the electrochemical additive manufacturing system using one or more electrolyte-altering devices, wherein:
        the one or more characteristics of the electrolyte solution, which are changed, comprise one or more of an acid concentration, a feedstock ion concentration, and a plating additive concentration, and
        the one or more characteristics of the electrolyte solution are changed based on the one or more measured values.

2. The method of claim 1, wherein flowing the current between the electrode array and the deposition electrode is caused by selectively applying an individual voltage between the deposition electrode and each electrode portion in the subset of the individually-addressable electrode portions.

3. The method of claim 1, wherein:
the electrolyte solution is flowed into the gap from a supply reservoir; and
the electrolyte solution is recirculated back into the supply reservoir after exiting the gap.

4. The method of claim 3, further comprising flowing a second electrolyte solution from a second supply reservoir into the gap, wherein the target material is deposited out of the second electrolyte solution onto the deposition electrode.

5. The method of claim 4, further comprising changing one or more characteristics of the second electrolyte solution, wherein the one or more characteristics of the second electrolyte solution, which are changed, comprise one or more of the acid concentration, the feedstock ion concentration, and the plating additive concentration.

6. The method of claim 1, wherein the one or more characteristics of the electrolyte solution are changed before flowing the electrolyte solution into the gap or while the electrolyte solution is in the gap.

7. The method of claim 1, wherein the one or more characteristics of the electrolyte solution, which are changed, comprise two or more of the acid concentration, the feedstock ion concentration, and the plating additive concentration.

8. The method of claim 1, wherein:
the electrodeposition cell has a volume filled with the electrolyte solution,
the electrolyte solution is flowed at a volumetric flow rate through the electrodeposition cell, and
a ratio of the volume to the volumetric flow rate is less than 1 second.

9. The method of claim 1, wherein:
the electrochemical additive manufacturing system further comprises a collection reservoir; and
the electrolyte solution flows from the gap into the collection reservoir.

10. The method of claim 1, wherein the one more electrolyte-altering devices comprise one or more of a material injector, a thermal unit, and a filter.

11. The method of claim 10, wherein:
the one more electrolyte-altering devices comprise the material injector; and
the material injector changes the one or more characteristics of the electrolyte solution by injecting one or more of a solvent, an acid, a feedstock ion source, and a plating additive into the electrolyte solution.

12. The method of claim 11, wherein:
the solvent is selected from the group consisting of water, molten salts, organic solvents, and ionic liquids;
the acid is selected from the group consisting of sulfuric acid, acetic acid, hydrochloric acid, nitric acid, hydrofluoric acid, boric acid, citric acid, and phosphoric acid;
the feedstock ion source is selected from the group consisting of copper sulfate, copper chloride, copper fluoroborate, copper pyrophosphate, copper cyanide, nickel sulfate, nickel ammonium sulfate, nickel chloride, nickel fluoroborate, zinc sulfate, sodium thiocyanate, zinc chloride, and ammonium chloride; and
the plating additive is selected from the group consisting of an accelerator, a suppressor, a brightener, a grain refiner, a leveler, and co-deposition particulates.

13. The method of claim 11, wherein:
the electrolyte-altering device is the filter; and
the filter changes the one or more characteristics of the electrolyte solution by removing at least a part of the plating additive from the electrolyte solution.

14. The method of claim 13, wherein flowing the electrolyte solution through the filter is selectively controlled using a valve.

15. The method of claim 1, wherein the one or more characteristics of the electrolyte solution are measured using one or more of a thermocouple, a pH meter, an ultraviolet and visible light range (UV-Vis) spectrometer, an inline process mass spectrometer, a high-performance liquid chromatography (HPLC) device, a cyclic voltammetric stripping (CVS) device, or a potentiostat.

16. The method of claim 1, wherein the one or more characteristics are measured before the electrolyte solution enters the gap.

17. The method of claim 1, wherein the one or more characteristics are measured after the electrolyte solution has exited the gap.

18. The method of claim 1, wherein:
the gap has a first height value when flowing an electrolyte solution into the gap;
the gap has a second height value during depositing the target material; and
the first height value is greater than the second height value.

19. The method of claim 1, wherein the one or more characteristics of the electrolyte solution, which are changed, comprise the acid concentration.

20. The method of claim 1, wherein the one or more characteristics of the electrolyte solution, which are changed, comprise the feedstock ion concentration.

* * * * *